(12) United States Patent
Shah (10) Patent No.: US 7,296,496 B2
(45) Date of Patent: Nov. 20, 2007

(54) METHOD OF SLOWING A HYDROSTATIC DRIVE WORK MACHINE

(75) Inventor: Vaibhav H. Shah, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 370 days.

(21) Appl. No.: 11/034,297

(22) Filed: Jan. 12, 2005

(65) Prior Publication Data

US 2006/0150809 A1 Jul. 13, 2006

(51) Int. Cl.
 *F16H 47/00* (2006.01)
(52) U.S. Cl. ...................................... 74/733.1
(58) Field of Classification Search ............... 74/731.1, 74/732.1, 733.1; 60/368, 428, 436, 441, 60/490, 491
 See application file for complete search history.

(56) References Cited

U.S. PATENT DOCUMENTS

| | | | |
|---|---|---|---|
| 4,193,323 A * | 3/1980 | Bubula et al. ................. | 475/83 |
| 5,435,131 A * | 7/1995 | Hausman et al. ............. | 60/327 |
| 5,529,546 A | 6/1996 | Ishino et al. | |
| 5,624,339 A | 4/1997 | Coutant et al. | |
| 5,784,883 A * | 7/1998 | Ohkura et al. ................. | 60/327 |
| 5,996,343 A * | 12/1999 | Kuras .......................... | 60/448 |
| 6,519,937 B2 * | 2/2003 | Nanri et al. ................... | 60/327 |
| 6,988,571 B2 * | 1/2006 | Okamoto et al. .......... | 180/6.48 |

FOREIGN PATENT DOCUMENTS

| | | |
|---|---|---|
| GB | 1053434 | 1/1967 |
| GB | 1285543 | 8/1972 |

* cited by examiner

*Primary Examiner*—Dirk Wright
(74) *Attorney, Agent, or Firm*—Liell & McNeil (57) ABSTRACT

A method of reducing speed in a hydrostatic drive work machine, and a hydrostatic drive work machine are provided. The method includes the steps of retarding the work machine by at least one of, upstroking a variable displacement hydraulic motor thereof, and downstroking a variable displacement pump coupled with the motor. An offgoing clutch pressure is dropped after each of the motor and pump displacements reaches a predetermined point. The steps of slowing the work machine are carried out by adjusting the respective displacements at rates based on a predetermined acceleration limit and/or a predetermined jerk limit of the work machine. The hydrostatic drive work machine further includes an electronic control module having a control algorithm recorded thereon for to neutral.

20 Claims, 3 Drawing Sheets

METHOD OF SLOWING A HYDROSTATIC DRIVE WORK MACHINE

TECHNICAL FIELD

The present disclosure relates generally to hydrostatic drive work machines, and relates more particularly to a process and software control algorithm for slowing such a machine.

BACKGROUND

Hydrostatic or "hystat" drive refers generally to a drive train or portion of a drive train in a work machine utilizing hydraulic fluid pressurized by engine rotation as the motive force for propelling the work machine. In a typical design, a pump is driven with an output shaft of the engine and provides pressurized hydraulic fluid to a hydraulic motor, in turn coupled with one or more axles of the work machine. In most hystat drive work machines, the pump and motor each have a variable displacement, allowing the relative torque and speed of a drive shaft to be continuously varied.

Where it is desirable to provide a relatively higher torque to the work machine wheels or tracks, the displacement of the motor will be relatively large such that at a given hydraulic pressure from the pump, a relatively large force is transferred to the drive shaft and wheels or tracks for each stroke of the motor. Similarly, where it desirable to provide a relatively lower torque to the work machine wheels or tracks, for example, when operating the work machine at relatively higher velocity, the relative displacement of the motor can be decreased. Displacement of the pump can be similarly adjusted, creating a continuously variable coupling between the engine and the ground engaging wheels or tracks of the work machine.

While the combination of a variable displacement pump and variable displacement motor in a hystat work machine imparts tremendous flexibility in operation, there is room for improvement. Particularly in work machine applications that require relatively frequent accelerations, decelerations, stops and starts, for example, loader operations, the wear and tear on the work machine and even the operator can be significant.

In some known hydrostatic drive designs, operators can slow the work machine by decreasing the pump displacement. This approach takes advantage of available energy in the form of hydraulic pressure in the drive system that might otherwise be wasted. In effect, the pump acts as a hydraulic brake. Moreover, using the pump to slow the work machine can somewhat reduce the use of wheel brakes, prolonging their life. In many instances, however, the pumps mounted in hydrostatic drive work machines are insufficiently large or have too slow a stroking rate to substantially slow the work machine in a reasonable amount of time. Larger pumps having this capability tend to be significantly more expensive.

Even where a sufficiently large or fast pump is available, it can be challenging for even highly skilled operators to adjust the pump at an appropriate rate. Changing pump displacement too quickly could cause the work machine to decelerate too rapidly, or can unduly change the rate of deceleration, such that the work machine and operator are jerked. This can be not only uncomfortable for the operator, but can also risk tipping the machine or spilling a load carried thereon. On the other hand, changing pump displacement too slowly can fail to bring the work machine to a stop quickly enough and can waste operating time. The operator's control can thus limit shift quality, for example, if the operator adjusts the pump too slowly, or compromise smoothness, for example, if the pump is adjusted too quickly or the wheel brakes are applied too forcefully. Moreover, different operators can have different personal shifting preferences. While one operator may be willing to undergo a relatively abrupt stop, other operators may be unwilling or unable to tolerate jerks or rapid decelerations. Thus, hardware selection alone is typically inadequate in ensuring a system well suited to different operators.

Co-owned U.S. Pat. No. 5,624,339 shows a method for controlling shift points in a continuously variable transmission that includes a hydrostatic drive path or a combined hydrostatic and mechanical transmission drive path. The mechanical transmission includes a planetary summing arrangement that appears to allow for smooth shift without disruption of torque. Although this strategy and structure appears promising, there always remains room for improving upon the overall combination of work efficiency with rider comfort.

The present disclosure is directed to one or more of the problems or shortcomings set forth above.

SUMMARY OF THE DISCLOSURE

In one aspect, the present disclosure provides a method of reducing speed in a hydrostatic drive work machine, comprising the step of retarding the work machine by at least one of, downstroking a variable displacement pump and upstroking a variable displacement motor in a work machine hydrostatic drive that includes a transmission.

In another aspect, the present disclosure provides an article that includes a computer readable medium having a control algorithm recorded thereon. The control algorithm includes means for slowing a hydrostatic drive work machine having at least two gears, the means for slowing including means for slowing the work machine by at least one of upstroking a variable displacement motor of the work machine toward an increased displacement, and downstroking a variable displacement pump fluidly connected with the variable displacement motor toward a decreased displacement.

In still another aspect, the present disclosure provides a hydrostatic drive work machine that includes a variable displacement motor, a variable displacement pump fluidly connected with the variable displacement motor, and a transmission operably coupled with the motor and having at least two gears. An electronic control module is provided and is in control communication with the motor, the pump and the transmission. The electronic control module includes an article having a computer readable medium with a control algorithm recorded thereon. The control algorithm includes means for adjusting a displacement of each of the motor and the pump, and means for slowing the work machine with at least one of the motor and the pump.

DETAILED DESCRIPTION

Figure 1:
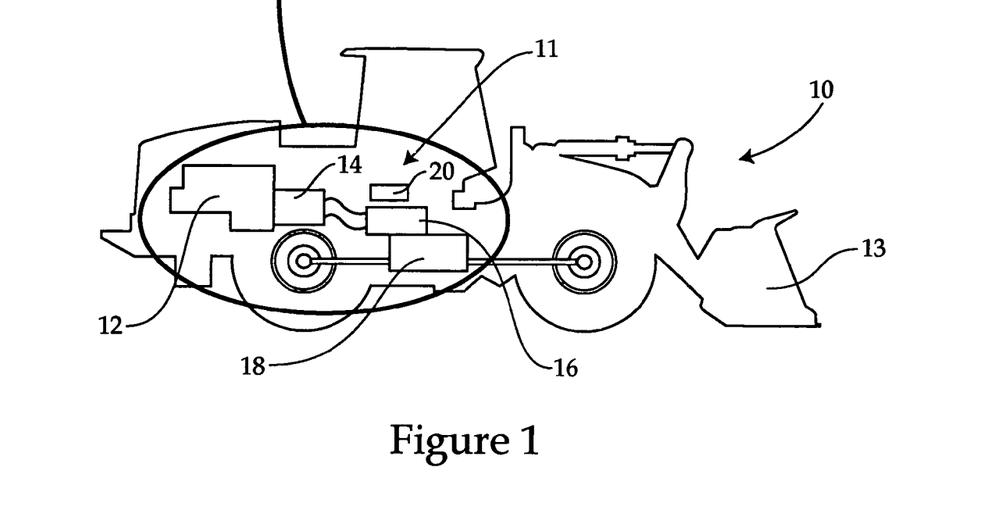
FIG. 1 is a diagrammatic side view of a hydrostatic drive work machine according to a preferred embodiment of the present disclosure.

Referring to FIG. 1, there is shown a hydrostatic drive work machine 10. Work machine 10 includes a hydrostatic drive 11 disposed therein, including an engine 12, a variable displacement pump 14, a variable displacement motor 16 and a gearbox or transmission 18 having at least two gears 18a and 18b. An electronic control module 20 is further provided, and is operable to electronically control various of the components of hydrostatic drive 11 to slow the same, for example, where the work machine is slowed and shifted to neutral, as described herein. The present disclosure is concerned primarily with a process of slowing work machine 10, however, in many instances slowing of work machine 10 will be followed by shifting to neutral, e.g. disengaging both of gears 18a and 18b. This will typically be the case where, for example, work machine 10 is being parked or will remain stopped for some time. Work machine 10 is illustrated as a loader having a bucket 13, however, it should be appreciated that FIG. 1 is exemplary only, and work machine 10 might be any of a wide variety of hydrostatic drive machines, many of which are known in the art.

Work machine 10 may be equipped with a set of controls which allow the operator to adjust an engine throttle and control travel direction or stopping with a conventional control handle or lever. In one embodiment, the operator will push forward on the control handle to move work machine 10 in a forward direction, and will pull backward on the handle to move work machine 10 in a reverse direction. To shift work machine 10 to neutral, the operator will simply push or pull the control handle to a neutral, for example, a center position. To initiate slowing of work machine 10, the operator may, for example, adjust a position of the control handle, or simply actuate a brake. In one embodiment, slowing of work machine 10, as described herein, and shifting to neutral will be simultaneously commanded by moving the control handle to the center position. In such an embodiment, work machine 10 may first slow to a minimal or zero ground speed, then transmission 18 shifted to neutral. Additional control levers or buttons, for example, may also be provided to enable the operator to selectively manually adjust various of the work machine components, including one or more of the components of hydrostatic drive 11, as described herein.

It is further contemplated that electronic control module 20 will be operable to electronically control all of the components of hydrostatic drive 11 while slowing work machine 10, and during a shift to neutral, without any input from the operator other than commanding the slowing and/or shift itself. For certain applications, however, or it may be desirable for the operator to have manual control over one or more of the components of hydrostatic drive 11 during slowing or a shift to neutral. Accordingly, the operator controls can be designed such that an input from the operator will override or supplement automatic commands from the electronic control module 20. The operator may wish to interrupt or temporarily suspend the various adjustments in hydrostatic drive 11 attendant to slowing or performing a shift to neutral. For example, if an obstruction is detected, the operator may wish to apply wheel brakes or engine brakes to stop work machine 10 immediately rather than allowing the work machine to slow according to the control commands from electronic control module 20. Embodiments are contemplated wherein application by the operator of wheel or engine brakes will deactivate the electronic control described herein of pump 14 and motor 16 commanded by electronic control module 20.

Figure 2:
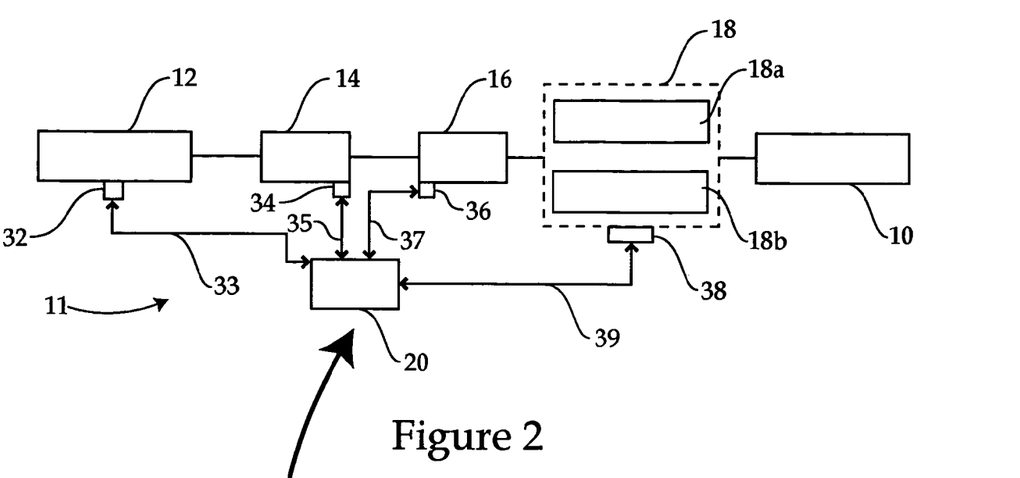
FIG. 2 is a schematic view of a hydrostatic drive and electronic control system suitable for use with the work machine of FIG. 1.

Referring also to FIG. 2, there is shown a schematic of hydrostatic drive system 11. Electronic control module 20 is connected to, and in control communication with, a throttle actuator 32 via a communication line 33. In one embodiment, electronic control module 20 is operable to adjust a position and/or rate of change in position of an engine throttle by adjusting actuator 32. Electronic control module 20 can thus control the fueling and speed of engine 12, or rates of change thereof. Work machine 10 may be further equipped with a conventional throttle control whereby the operator can manually adjust throttle position, for example, utilizing an accelerator pedal.

Another communication line 37 may connect electronic control module 20 with a motor actuator 36, allowing electronic control module 20 to adjust a position or rate of change in position of motor 16. Motor 16 may be a variable displacement motor similar in design to pump 14, described herein, and adjustment of the position of motor actuator 36 adjusts a relative displacement of motor 16. A manual motor controller, for example a control lever, may also be positioned within reach of the operator in work machine 10 such that he or she can manually control motor actuator 36.

Electronic control module 20 may further be in control communication with a transmission actuator, preferably a clutch actuator 38, via a communication line 39. Transmission 18 will typically include at least a low gear 18a and a high gear 18b, although more than two gears may be employed in other applications without departing from the intended spirit and scope of the present disclosure. Clutch actuator 38 will thus typically comprise two clutch actuators, operably coupled one with each of gears 18a and 18b, in a conventional manner. For clarity, only a single transmission/clutch actuator is illustrated.

Work machine 10 may also include conventional clutch pedals or control levers such that the operator can selectively engage or disengage the clutches as desired. In such an embodiment, the operator can manually shift work machine 10 between high and low gears, in either of forward or reverse travel directions. Electronic control module 20 may also be programmed such that upshifting and downshifting takes place automatically, in consideration of such factors as throttle position, work machine speed, transmission output speed, motor displacement and pump displacement. Even where electronic control module 20 automatically controls shifting in transmission 18, work machine 10 may be designed such that the operator can override the electronically controlled shifting, either by simply manually adjusting the clutches or by disabling the control functions of electronic control module 20.

Electronic control module 20 is further connected to, and in control communication with, a pump actuator 34 via a communication line 35. Control module 20 will typically be operable to adjust a position and/or rate of change in position of pump 14 with actuator 34. Manual controls may also be provided in work machine 10 such that the operator can manually adjust pump displacement. Pump 14 may be a bi-directional variable displacement swash plate pump, wherein adjustment of the position of a body of pump 14 relative to its swash plate adjusts the displacement thereof, in a manner well known in the art.

The term "bi-directional" should be understood to refer to a pump that is capable of pumping hydraulic fluid in either of two directions. In such an embodiment, the angle of the swash plate of pump 14 relative to the body thereof can vary between a maximum displacement at a first, for example positive, displacement orientation for forward travel of work machine 10, and a second, for example negative, displacement orientation for reverse travel of work machine 10. Where the swash plate is at a zero angle relative to the pump body, the displacement is zero, i.e. the pump is displacing no fluid while rotating, and is placing a minimum load on engine 12. Where the relative swash plate angle is adjusted from the zero angle toward the positive displacement orientation, pump 14 displaces an increasing amount of fluid to motor 16 in a first direction. Conversely, where relative swash plate angle is adjusted toward the negative displacement orientation, pump 14 displaces an increasing amount of fluid to motor 16 in a second, reverse direction.

The fluid coupling of pump 14 with motor 16 allows a relative swash plate angle of pump 14 to determine the direction and flow rate of fluid that is pumped to motor 16. Thus, adjustment of displacement of pump 14 can reverse the direction that motor 16 is rotating and thus reverse the direction of power to the wheels or tracks of work machine 10, and ultimately the travel direction thereof.

Motor 16 is similar to pump 14 in that its displacement may be varied by adjusting an angle of a drive plate or swash plate associated therewith. In one embodiment, motor 16 is adjustable between a maximum positive displacement orientation and a minimum displacement orientation, relatively close to or at zero. Thus, motor 16 is not bi-directional as described herein, although a bi-directional motor might be used without departing from the scope of the present disclosure.

Electronic control module 20 will further include an article having a computer readable medium with a control algorithm recorded thereon. The control algorithm includes means for slowing or retarding work machine 10 by at least one of, upstroking motor 16 toward an increased displacement, and downstroking pump 14 toward a decreased displacement. In most instances, both of pump 14 and motor 16 will be adjusted. The means for slowing may further include means for shifting, including means for dropping an offgoing clutch pressure of work machine 10 to selectively disengage the gear 18a, 18b associated therewith. The same control algorithm may thus be utilized not only to slow work machine 10, but to shift work machine 10 from either forward or reverse to neutral, bringing work machine 10 to a stop from either travel direction. Electronic control module 20, via the control algorithm, may command dropping of an offgoing clutch pressure at a point in time after motor 16 and pump 14 have been adjusted to increased and decreased displacements, respectively, as described herein.

The means for slowing may further include means for slowing the work machine, prior to dropping the offgoing clutch pressure, by upstroking motor 16 toward an increased displacement at a first rate. The means for slowing also may include means for slowing work machine 10 prior to dropping the offgoing clutch pressure, by downstroking pump 14 toward a decreased displacement at a second rate. The first and second rates can be the same rate of change in relative displacement, or different rates, depending upon factors such as hardware size and responsiveness. For instance, where pump 14 is of a different size than motor 16, a given change in relative displacement of pump 14 may have a different slowing effect on work machine 10 than a similar change in relative displacement of motor 16. Further factors, such as gearbox ratios, vehicle weight, engine size and clutch size may all bear on the optimum rates of change in displacement in motor 16 and pump 14 that will slow work machine 10 at a desired rate, as described herein. Each of pump 14 and motor 16 will typically be adjusted at a rate based at least in part on one or both of a predetermined acceleration limit and a predetermined jerk limit of work machine 10, as described herein.

Work machine 10 will typically be slowed by adjusting motor 16 prior to adjusting pump 14. Downstroking of pump 14 may be initiated at a time based at least in part on the displacement of motor 16. To this end, the means for slowing may also include means for determining a displacement of motor 16, and means for initiating downstroking of pump 14 when motor displacement reaches an appropriate displacement, for example, a maximum displacement. In a related vein, the means for slowing may further include means for determining a displacement of pump 14, and means for dropping the offgoing clutch pressure at a time based on the displacement thereof. Those skilled in the art will appreciate that the relative timing of adjusting, and initiating adjusting, pump 14 and motor 16 may be varied from the presently disclosed embodiments without departing from the intended scope of the disclosure.

As it is desirable to complete adjustment of the displacement of motor 16 and pump 14 prior to dropping the offgoing clutch pressure, electronic control module 20 may be operable to selectively initiate dropping of the offgoing clutch pressure only if, both the displacement of motor 16 is at its maximum displacement, and the displacement of pump 14 is at zero. Offgoing clutch pressure may be dropped at a predetermined rate, such that the offgoing clutch does not disengage prior to the point in time at which motor 16 and pump 14 have completed slowing work machine 10. The maximum displacement of motor 16 and zero or minimum displacement of pump 14 may both be verified, for example, based on an angle of the pump swash plate and angle of the motor drive plate relative to the respective pistons of pump 14 and motor 16, respectively, or by any other suitable means such as the position of the actuators 34 and 36, respectively, associated therewith.

Prior to initiating dropping of the offgoing clutch pressure, electronic control module 20 will typically set a delay time to ensure that pump 14 has reached a point at or closed to its decreased displacement. This delay time may generally based at least in part on one or both of a pump stroking rate and a pump response time. For instance, a relatively less responsive pump would require a relatively longer delay time, whereas a more responsive pump would require a relatively shorter delay time. Similarly, the rate of adjustment of pump 14 will bear on the requisite delay time, as will the relative change in displacement. For instance, where the displacement of pump 14 is relatively great prior to the slowing or shift to neutral command, the time required for pump 14 to reach its decreased displacement may be relatively longer. The control algorithm may also include means for verifying that motor 16 has reached its desired increased displacement, based on similar concerns.

During slowing of work machine 10 according to the present disclosure and, for example, also a shift to neutral, work machine 10 will typically be slowed at an initial deceleration by upstroking motor 16 at the first rate and, subsequently slowed at a greater deceleration by downstroking pump 14 at the second rate. It should be appreciated that the description herein of the "first" and "second" rates is not intended to imply, for example, that adjusting displacement of motor 16 faster than adjusting displacement of pump 14 will necessarily cause pump 14 to slow work machine 10 more than motor 16. In other words, the "rates" may be rates of adjustment in relative displacement only, although it is contemplated that the first and second rates may be correlated with their attendant rates of decelerating work machine 10.

The relative hardware size and responsiveness will generally have significant importance in the capacity for either of pump 14 and motor 16 to slow work machine 10 for a given change in relative displacement. Further, each of the first and second rates will typically be at least partially linear, and based at least in part on one or both of the acceleration limit and jerk limit of work machine 10. Although the initial deceleration with motor 16 will be relatively greater than the subsequent deceleration with pump 14 in most embodiments, the deceleration rates could be the same or different, without departing from the scope of the present disclosure.

The predetermined acceleration limit can be generally understood to be the maximum rate at which it is desirable to change the velocity of work machine 10, by either slowing down or speeding up. While the predetermined acceleration limit can vary based on numerous factors, described herein, peak accelerations of approximately positive or negative 1.0 g or less have been found to be both attainable and acceptable in work machine 10. Thus, in one embodiment, the predetermined acceleration limit might be set at approximately 1.0 g. Jerk is the rate of change in acceleration and, hence, the jerk limit can be generally understood to be the maximum rate at which it is desirable to increase or decrease the acceleration of work machine 10.

Jerk values of approximately positive or negative 0.2 g/s or less have been found to be both attainable and acceptable in work machine 10. Thus, in one embodiment, the predetermined jerk limit might be set at approximately 0.2 g/s. Those skilled in the art will recognize that these numbers reflect satisfactory perceptions from most operators most of the time. There will often be a minority of operators that are more aggressive or less aggressive. Other considerations could be utilized in arriving at these predetermined limits. For instance, these limits might be regulated by a government agency.

It should be understood that it is generally desirable, though not required, that a shift to neutral in work machine 10 take place as rapidly as possible without exceeding the predetermined acceleration and jerk limits. Thus, motor displacement, and pump displacement, where adjusted, will be changed at rates, i.e. the first and second rates, which yield changes in work machine velocity and acceleration that are as close as practicable to the predetermined acceleration limit and jerk limit, respectively, without exceeding the same.

By controlling a shift to neutral in work machine 10 as described herein, shift duration can be as fast as practicable, and thus work machine operating efficiency can be improved. This will reduce the time required to slow the work machine to a stop with motor 16 and pump 14, without risking excessive acceleration or jerk. In certain earlier systems, operators would be tempted to adjust the pump or motor more slowly to avoid risking excessive acceleration or jerk. In contrast, the present disclosure allows adjustment of each component necessary to slow work machine 10, effect a shift to neutral and stop, without exceeding operating thresholds.

As used herein, the terms predetermined acceleration limit and predetermined jerk limit should be understood to include quantities that are calculated, inferred or estimated on-the-fly, i.e. during operation, as well as such quantities as may be determined by simulation, or from one or a small number of test machines, and applied broadly to a line of similar or identical work machines. In other words, the predetermined acceleration limit and predetermined jerk limit might be determined by calculating limits specific to an individual work machine, for example, by field testing, then programming control module 20 accordingly. Such parameters might further be calculated or selected based upon different operating conditions, in real time, for example with different types of work machines or work machine bucket loads. A relatively high friction surface such as pavement might call for a different acceleration limit or jerk limit than a relatively low friction surface such as ice or snow.

Alternatively, where it is desirable to preprogram a plurality of control modules prior to assembling them with a plurality of respective work machines, each control module may be programmed with predetermined acceleration and jerk limits broadly applicable to more than one work machine, irrespective of minor hardware or operating differences and operating or environmental conditions.

It is contemplated that the latter instance, i.e. preprogramming the electronic control modules of plural work machines based on preexisting data, will be a practical implementation strategy. The particular operating parameters may be determined by actual tests on a machine, for example, utilizing one or more accelerometers and incorporating the determined limits into the control software, or by computer simulation that models various operating conditions, or by a combination of both approaches.

In one contemplated embodiment, the acceleration and jerk limits will be determined through skilled operator testing. Over the course of many hours of work machine operating experience, operators can develop relatively repeatable shift procedures, based generally on their own preferences. Thus, to determine a limit such as an acceleration or jerk limit, an operator will perform a specific task, such as bringing the work machine to a stop as quickly as they wish, or as quickly as is comfortable. The work machine can be equipped with various monitoring devices, such as accelerometers, to allow the operating parameters of each shift to neutral to be recorded. Numerical values for a maximum desirable acceleration and/or jerk can thus be determined, and later programmed into electronic control module 20.

Further, in certain jurisdictions it may be required to limit jerking and excessively accelerating a work machine and its operator. Thus, externally provided limits might be used in conjunction with the present disclosure to arrive at the acceleration and jerk thresholds programmed in the control algorithm of electronic control module 20. In a similar vein, customer or operator requests for relatively more or less aggressive shifting might be incorporated into the control software, even if some smoothness or efficiency must be sacrificed. Thus, while it is contemplated that a balance of smoothness and efficiency will be sought when setting the predetermined acceleration and jerk limits, it should be understood that this balance may vary depending upon many different factors, as described herein.

Figure 3:
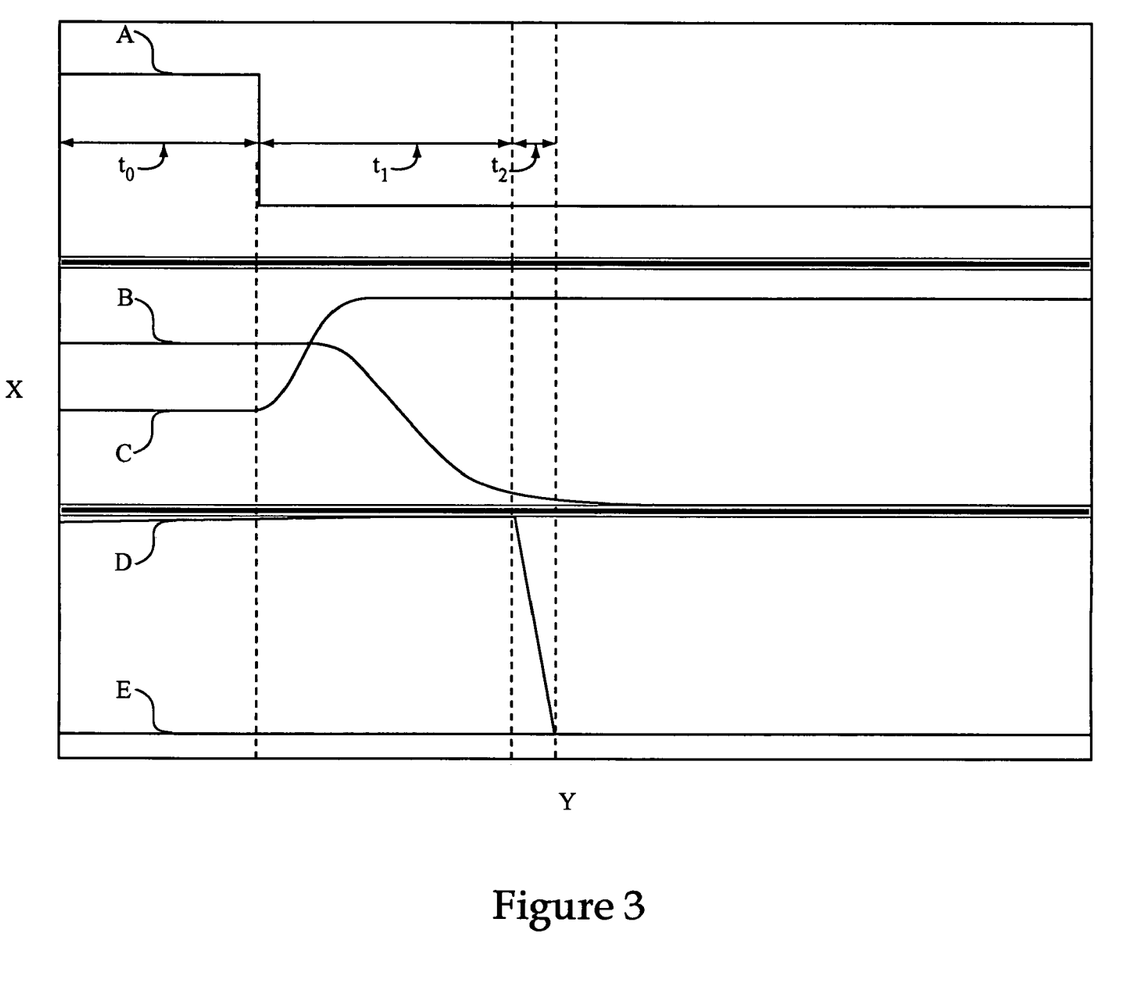
FIG. 3 is a graph illustrating a shift to neutral in a hydrostatic drive work machine.

Turning now to FIG. 3, there is shown a graph illustrating an exemplary shift to neutral or slowing of work machine 10. The "X" axis represents signal values from various sensors, actuators, etc. associated with the various components represented in FIG. 3, as described herein. The "Y" axis represents relative elapsed time during the event. Line "A" represents the gear signal, for example, an electronic signal from electronic control module 20 sent to actuator 38. Line "B" represents displacement of pump 14 during the event, whereas line "C" represents displacement of motor 16. Lines "D" and "E", respectively, represent low clutch and high clutch pressures.

A first portion of line A corresponds with a time period, $t_0$, prior to initiating slowing or a shift to neutral in work machine 10 with gear signal A. During $t_0$, pump displacement B and motor displacement C may remain constant. During "ordinary" operation of work machine 10, that is, where no shifting is occurring, pump displacement B will typically be controlled based predominantly on a throttle position in work machine 10, whereas motor displacement C will be controlled based on ground speed. Thus, a slowing or shift to neutral command from the operator might take place while work machine 10 is accelerating or already decelerating, and pump 14 and motor 16 are being adjusted based on a change in throttle position, and ground speed respectively. When the slowing or shift command is made at the end of to, the gear signal A will show a different, for example, higher signal value.

Once a shift to neutral is commanded with electronic control module 20, beginning the time period $t_1$, pump displacement B and motor displacement C will be adjusted to slow work machine 10 toward zero velocity. Thus, shortly after $t_1$ begins, pump 14 will be downstroked and motor 16 will be upstroked, toward decreased and increased displacements, respectively. At or close to a time at which pump displacement B reaches its decreased displacement, and motor displacement C reaches its increased displacement, time period $t_2$ begins. During $t_2$, clutch pressure D, for example, the low clutch pressure in work machine 10, will be decreased to disengage the corresponding clutch 18a in transmission 18. Once clutch 18a is disengaged, work machine 10 will typically have reached a stop, and transmission 18 disengaged.

Downstroking pump 14 preferably slows work machine 10 at a lesser deceleration than the initial slowing with motor 16, and also may take place without adjusting any of motor displacement, clutch pressure or throttle position. It should be appreciated, however, that the relative deceleration from adjustment of motor 16 might be lesser, or the decelerations induced with motor 16 and pump 14 the same, without departing from the scope of the present disclosure. Accordingly, the rate of change in relative displacement of pump 14 may be relatively slower than the rate of change in relative displacement of motor 16. The relative rates, however, may depend upon such factors as hardware size and responsiveness, as described herein, and the present disclosure is thus not thereby limited.

INDUSTRIAL APPLICABILITY

Slowing of work machine 10 as described herein will typically, but not necessarily, be desirable where an operator is bringing work machine 10 to a stop. Similarly, when stopping work machine 10, it will typically be shifted to neutral, either by disengaging transmission 18 or by adjusting pump 14 to a zero displacement. Slowing or shifting to neutral will generally be available according to the present disclosure, when traveling in either forward or reverse. This may occur, for example, where an operator is picking up or delivering a load of materials, or where he or she simply wishes to stop the work machine to suspend operation, for example, when parking, or wishes to slow down.

The following description is concerned primarily with a situation where the operator commands a full shift to neutral, to bring work machine 10 to a complete stop, disengage the clutches, and possibly dump a load or set the parking brake. However, it should be appreciated that where the operator merely wishes to slow work machine 10, electronic control module 20 can perform only those steps in a full shift to neutral process as are necessary to slow work machine 10 sufficiently, without completely stopping it. Electronic control module 20 may distinguish between a shift to neutral command and a slowing command, for example, based on control lever position. Alternatively, the same command might be executed by the operator, and the shift to neutral process manually interrupted by the operator when sufficient slowing or work machine 10 has occurred, for example, by initially pushing a control lever to a shift to neutral position, then reversing the same once work machine 10 has slowed sufficiently.

Figure 4:
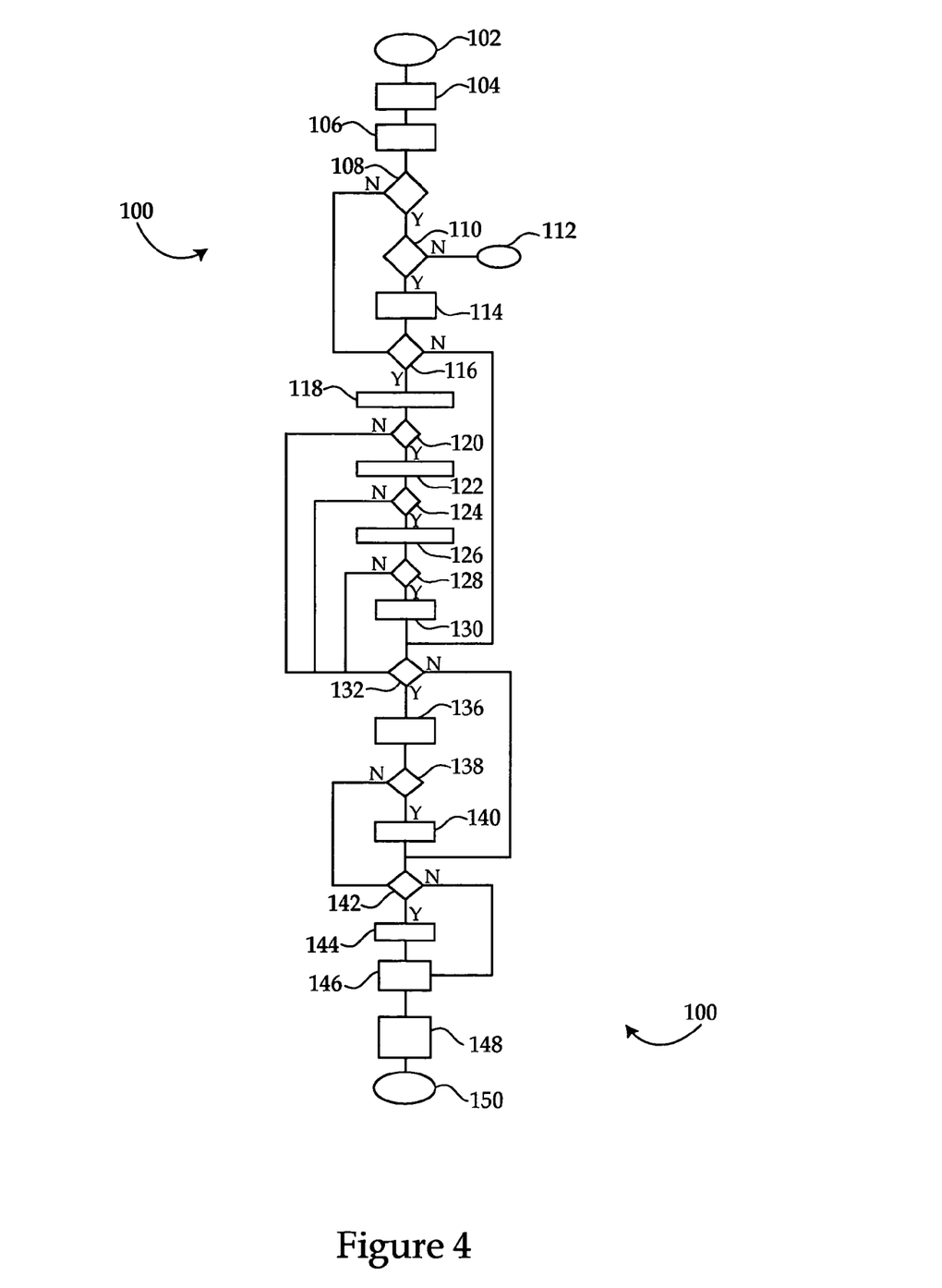
FIG. 4 is a flow chart illustrating operation of a control algorithm for shifting to neutral in a hydrostatic drive work machine.

As the operator approaches the loading or drop-off site, or a parking space, he or she will initiate the shift to neutral, and hence slowing of work machine 10, by commanding a shift to neutral, for example, with a control lever in work machine 10. A shift to neutral signal from the operator will be received by control module 20, initiating a series of steps that will slow work machine 10 toward a stop. Referring also to FIG. 4, there is shown an exemplary flow chart 100 illustrating steps in a shift to neutral event carried out via the control algorithm on electronic control module 20. The shift to neutral control process begins at a Start, Box 102, corresponding to a shift to neutral command from an operator, for example, where the operator wishes to stop the work machine 10 to dump a bucket load. Box 104 follows Box 102, and represents sample inputs to electronic control module 20, including for example, pump displacement, motor displacement, commanded pump steady state displacement, commanded motor steady state displacement, low clutch and high clutch pressures, desired gear and low clutch relative velocity.

The process will proceed to Box 106, initialization, wherein electronic control module 20 may adjust or set the various electronically controlled components in work machine 10 to states necessary for a shift to neutral. A first trigger will occur at Box 106, if the various requisite conditions are met. These may include, for example, an initial gear, a minimum pump displacement, a maximum pump displacement, a minimum motor displacement for low gear, a maximum motor displacement, and various factors relating to the rates of change in pump and motor displacement or clutch pressure. It should be appreciated that certain variables may be "soft-coded," and depend on the particular hardware selected for work machine 10. These can include, for example, pump and motor size, gearbox ratios, clutch size, engine size and type and vehicle weight.

Following initialization, electronic control module 20 will begin a series of steps that can be considered a "shift detection." Electronic control module 20 will typically verify, Box 108, that the initial gear is a low gear, and that the first trigger exists for shifting to neutral. If the first trigger does not exist, then the process will proceed to Box 116 to ascertain whether a second trigger exists, described below. If the first trigger does exist, then the process will proceed to Box 110, wherein electronic control module 20 will query whether the desired gear is neutral.

If the desired gear is not neutral, for example, if an error has occurred, then the process will proceed to an Exit, Box 112. If the requested gear is indeed neutral, then the process will proceed to Box 114 wherein electronic control module 20 will set or adjust the various electronically controlled components attendant to a second trigger, including for example, low clutch pressure, high clutch pressure, pump and motor displacement and desired gear.

Following the operation in Box 114, the process will proceed to Box 116, wherein electronic control module 20 will verify whether the second trigger exists. If no, then the process will proceed to Box 132 to ascertain whether a third trigger exists, described below. If the second trigger exists, then the shift detection portion will be concluded, and the process will proceed to Box 118.

At Box 118, electronic control module 20 will initiate upstroking of motor 16 toward its maximum displacement at the predetermined rate described herein. During upstroking of motor 16, the other variables, pump displacement, clutch pressures, will typically not be adjusted. Following the step in Box 118, the process will proceed to Box 120 wherein electronic control module 20 will query whether the motor displacement is at its maximum displacement. If motor displacement is not at the maximum, the process will proceed to Box 132, again to ascertain whether a third trigger exists.

If the motor displacement is at its maximum displacement at Box 120, the process will proceed to Box 122, wherein electronic control module 20 will initiate downstroking of pump 14 toward its zero displacement, at the predetermined rate described herein. Next, the process will proceed to Box 124, wherein electronic control module 20 will query whether the pump displacement is less than or equal to zero.

If pump displacement is not less than or equal to zero, the process will proceed to Box 132, once again to ascertain whether a third trigger exists, described below. If pump displacement is at or equal to zero, then the process will proceed to Box 126, wherein electronic control module 20 will initiate a count, or delay to ensure that pump 14 reaches zero displacement. The duration of the count or delay may be an adjustable parameter, dependent on stroking rate and pump responsiveness, and may also be based on a stored value of the previous delay from the last time work machine 10 was shifted to neutral. Next, the process will proceed to Box 128, wherein electronic control module 20 will query whether the count has yet reached a predetermined value. If no, then the process will proceed to Box 132, to ascertain whether the third trigger exists. If the count has reached the predetermined value, then the process will proceed to Box 130, at which point a third trigger will typically exist.

Following the third trigger of Box 130, in Box 132 electronic control module 20 will query whether the third trigger exists. If no, then the process will proceed to Box 142 to determine whether a fourth trigger exists, described below. If the third trigger exists, then the process will proceed to Box 136.

In Box 136, electronic control module 20 will initiate decreasing the offgoing clutch pressure at the predetermined rate described herein. During the operation illustrated with Box 136, pump displacement, motor displacement and high clutch pressure will typically not be adjusted. The process next proceeds to Box 138 wherein electronic control module 20 will query whether the low clutch pressure has reached a point less than or equal to zero. If clutch pressure is not less than or equal to zero, the process will proceed to Box 142 to determine whether the fourth trigger exists, described below. If the clutch pressure is at or less than zero, then the fourth trigger will typically exist, for example, at Box 140.

Subsequently, in Box 142, electronic control module 20 will query whether the fourth trigger exists. If no, then the process will proceed to Box 146, representing an output of the control code, including for example initial gear, trigger, pump displacement motor displacement, low clutch pressure and high clutch pressure. If the fourth trigger exists at Box 142, then electronic control module 20 will proceed to Box 144, wherein the initial gear is set to low, and the first trigger reset. Finally, the process will proceed, via Box 146, described above, to Box 148, wherein the current values of the control code output are stored to be used in the next step. The described flow chart 100 is exemplary only, and it should be appreciated that various of the steps and triggers might be alternatively designed without departing from the scope of the disclosure.

The present disclosure thus provides for slowing of work machine 10 without necessarily requiring wheel brakes, or another slowing means. The present disclosure thus provides a process whereby energy stored in the form of hydraulic pressure in hystat system 11 can be converted to braking power via pump 14 and/or motor 16. Moreover, smoother, more efficient shifting to neutral is possible than in earlier hydrostatic drive work machines. By minimizing shifting duration, without unduly accelerating or jerking the machine, productivity in work machine operations requiring relatively frequent stopping via shifts to neutral can be improved over earlier designs wherein an operator manually controlled shifting.

For example, in earlier manual or partially manual hydrostatic drive shifting schemes, an operator risked stalling the work machine, spilling loads, tipping the work machine or at least wasting operating time, if he or she adjusted hystat drive components too quickly or too slowly. A further problem with known designs relates to the tendency for a moving work machine accidentally placed in neutral to continue rolling. The present disclosure provides a mechanism for reducing speed in work machine 10 if it is accidentally placed in neutral, without the need for wheel brakes or other slowing means. For example, if an operator inadvertently knocks a control lever into a neutral position, pump 14 and motor 16 will typically respond just as if a slowing or shift to neutral command has been executed, and will slow work machine 10 accordingly.

Those skilled in the art will appreciate that in systems operating and designed according to the present disclosure, the duration of the shift to neutral is generally related to the smoothness of the shift, as experienced by the operator. In other words, the duration of the shift to neutral can be reduced to minimize the time required to stop work machine 10, increasing operating efficiency. Similarly, where a full shift to neutral is not carried out, but work machine 10 is merely slowed, it will be possible to decelerate work machine 10 without excessive decelerations or jerks. However, reductions in stopping time, i.e. increases in deceleration rate, may come with a trade-off in shift smoothness. The balance struck between shifting efficiency and smoothness will depend in large part upon the preferences of the individuals operating work machine 10, or on such factors as jurisdictional regulations, or hardware limitations.

Where relatively delicate tasks are performed by work machine 10, for example, transporting relatively fragile items, it may be desirable to program electronic control module 20 with predetermined acceleration limits and jerk limits that set a relatively low threshold. In such an application, the balance of smoothness versus efficiency may tend more towards smoothness to ensure work machine 10 experiences only relatively minor accelerations or jerks when stopping, to avoid breaking or dropping the fragile items. Where more rugged tasks are at hand, such as moving a pile of gravel, simply performing the operation as quickly as possible may be the primary concern, and relatively larger acceleration and jerk limits may be appropriate to slow or stop work machine 10 as quickly as possible. If the primary risk of significant acceleration or jerk is spilling gravel for instance, the balance of smoothness and efficiency may tilt more toward efficiency, and relatively rapid slowing and shifting to neutral, with relatively larger accelerations and jerks being acceptable.

Further tuning of the shifting or decelerating smoothness and/or shift efficiency can be achieved with relatively minor adjustments of the control algorithm, based on the "soft coded" variables. These include pump and motor size, gear ratios, etc. For a relatively larger pump, the decelerating effects on work machine 10 will be different than with a relatively smaller pump. Similarly, motor size will affect the relative capacity of motor 16 to decelerate work machine 10. The soft-coded variables can be increased or decreased proportionally to control the directional shift aggressiveness.

While the rates of adjustment of pump and motor displacement described and illustrated herein are at least partially linear, those skilled in the art will appreciate that in other applications, partially or wholly non-linear adjustment rates might be employed without departing from the intended spirit and scope of the present disclosure.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, when slowing work machine 10, and shifting to neutral, the reduction of offgoing clutch pressure is typically initiated upon concluding downstroking of pump 14, but might instead be initiated based upon some other trigger, such as an elapsed time following conclusion of upstroking motor 16.

Moreover, while work machine 10 is preferably slowed during a shift to neutral by adjusting displacement of both of motor 16 and pump 14, only one of motor 16 and pump 14 might be used to slow work machine 10, for example, where work machine 10 is traveling relatively slowly prior to the operator commanding the shift to neutral. Further still, electronic control module 20 might command an adjustment in position of engine throttle actuator 32 to slow engine 12, further slowing work machine 10 during the shift to neutral.

While the present description is primarily in the context of slowing work machine 10 when in a low gear, and shifting from low gear to neutral, it should be appreciated that alternative embodiments are contemplated wherein work machine 10 is slowed by shifting from a high gear to neutral. Moreover, if upon commanding a shift to neutral, work machine 10 is in high gear, electronic control module 20 could further be configured to signal the operator to downshift, or electronic control module 20 could automatically downshift work machine 10 by automatically disengaging high clutch 18b, and engaging low clutch 18b. Other aspects, features and advantages will be apparent upon an examination of the attached drawing Figures and appended claims.

What is claimed is:

1. A method of reducing speed in a hydrostatic drive machine comprising the steps of:
   retarding the machine within predetermined jerk and acceleration limits by a combination of, downstroking a variable displacement pump and upstroking a variable displacement motor in a machine hydrostatic drive that includes a transmission having at least two gears; and
   the retarding step includes communicating control signals from an electronic control module to the hydrostatic drive, and generating the control signals by executing a control algorithm in the electronic control module.

2. A method of reducing speed in a hydrostatic drive machine comprising the step of:
   retarding the machine by downstroking a variable displacement pump and upstroking a variable displacement motor in a machine hydrostatic drive that includes a transmission having at least two gears;
   downstroking the pump toward a decreased displacement at a first rate;
   upstroking the motor toward an increased displacement at a second rate;
   wherein each of the first and second rates is based at least in part on one or both of a predetermined acceleration limit and a predetermined jerk limit of the machine.

3. The method of claim 2 further comprising the step of:
   dropping an offgoing clutch pressure after each of the motor displacement and pump displacement reaches the increased displacement and decreased displacement, respectively.

4. The method of claim 1 wherein the step of retarding the machine comprises the steps of:
   initially slowing the machine by upstroking the variable displacement motor, prior to dropping the offgoing clutch pressure; and
   further slowing the machine by downstroking the variable displacement pump, prior to dropping the offgoing clutch pressure.

5. The method of claim 4 wherein:
   the step of initially slowing the machine comprises slowing the machine at an initial deceleration rate; and
   the step of further slowing the machine comprises slowing the machine at a subsequent deceleration rate that is greater than the initial deceleration rate.

6. The method of claim 5 wherein the step of slowing the machine by upstroking the variable displacement motor comprises, prior to initiating downstroking of the pump, verifying that the motor has reached a point at or close to the increased displacement.

7. The method of claim 6 wherein the step of dropping the offgoing clutch pressure comprises initiating dropping the same only if the motor displacement is at or close to a maximum motor displacement, and the pump displacement is at or close to a zero pump displacement.

8. The method of claim 7 wherein upstroking the motor, downstroking the pump, and dropping the clutch pressure are all effected with an electronic control module operable to send a control signal to actuators associated one with each of the motor, pump and a clutch.

9. The method of claim 2 wherein the first rate and the second rate are rates of change in relative displacement of the motor and the pump, respectively, each being at least partially linear and the first rate being relatively faster than the second rate.

10. An article comprising:
    a computer readable medium having a control algorithm recorded thereon, said control algorithm including means for slowing a hydrostatic drive machine having at least two gears, said means for slowing including means for slowing said machine within predetermined jerk and acceleration limits by a combination of:
    upstroking a variable displacement motor of the machine toward an increased displacement; and
    downstroking a variable displacement pump fluidly connected with said variable displacement motor toward a decreased displacement.

11. An article comprising:
    a computer readable medium having a control algorithm recorded thereon, said control algorithm including means for slowing a hydrostatic drive machine having at least two gears, said means for slowing including means for slowing said machine by at least one of:
upstroking a variable displacement motor of the machine toward an increased displacement;
downstroking a variable displacement pump fluidly connected
with said variable displacement motor toward a decreased displacement;
said means for slowing includes, means for slowing said machine at a first rate with said motor, and means for slowing said machine at a second rate with said pump;
wherein each of said first and second rates is based at least in part on one or both of an acceleration limit and a jerk limit of said machine.

12. The article of claim 11 wherein said means for slowing further includes means for determining a displacement of said motor, and means for initiating downstroking of said pump at a time based at least in part on the displacement of said motor.

13. The article of claim 12 wherein said means for slowing further includes means for determining a displacement of said pump and means for dropping an offgoing clutch pressure at a time based on the displacement of said pump.

14. The article of claim 13 wherein said means for slowing further includes:
means for activating a motor actuator to adjust a relative position of said motor at said first rate and a corresponding displacement thereof; and
means for activating a pump actuator to adjust a relative position of said pump at said second rate and a corresponding displacement thereof.

15. A hydrostatic drive machine comprising:
a variable displacement motor;
a variable displacement pump fluidly connected with said variable displacement motor;
a transmission operably coupled with said motor and having at least two gears;
an electronic control module in control communication with said motor, said pump and said transmission, said electronic control module including an article having a computer readable medium with a control algorithm recorded thereon, said control algorithm including:
means for adjusting a displacement of each of said motor and said pump; and
means for slowing said work machine within predetermined jerk and acceleration limits with a combination of said motor and said pump.

16. A hydrostatic drive machine comprising:
a variable displacement motor;
a variable displacement pump fluidly connected with said variable displacement motor;
a transmission operably coupled with said motor and having at least two gears;
an electronic control module in control communication with said motor, said pump and said transmission, said electronic control module including an article having a computer readable medium with a control algorithm recorded thereon, said control algorithm including:
means for adjusting a displacement of each of said motor and said pump;
means for slowing said machine with at least one of said motor and said pump; and
wherein said control algorithm further includes means for selectively disengaging one of said at least two gears when a displacement of said motor is at or close to an elevated displacement and a displacement of said pump is at or close to a decreased displacement.

17. The hydrostatic drive machine of claim 16 wherein said means for adjusting a displacement of each of said motor and said pump includes means for adjusting each of the same at rates based at least in part on one or both of a predetermined acceleration limit and a predetermined jerk limit of said work machine to slow said work machine.

18. The hydrostatic drive machine of claim 17 wherein said means for adjusting a displacement of each of said motor and said pump further includes means for initiating an upstroking of said pump at a time based at least in part on a displacement of said motor.

19. The hydrostatic drive machine of claim 18 wherein:
said motor includes a rotatable motor drive plate operable to reciprocate a plurality of motor pistons and disposed at an adjustable angle relative thereto;
said pump includes a rotatable pump drive plate operable to reciprocate a plurality of pump pistons and disposed at an adjustable angle relative thereto;
said transmission further including at least two clutches operably coupled one with each of said at least two gears, wherein said means for selectively disengaging includes means for dropping a clutch pressure of one of said clutches at a time based at least in part on one or both of an angle of the motor drive plate relative to the motor pistons and the angle of the pump drive plate relative to the pump pistons.

20. The hydrostatic drive machine of claim 18, further comprising:
a motor actuator coupled with said motor and operable to adjust a displacement thereof;
a pump actuator coupled with said motor and operable to adjust a displacement thereof;
at least one clutch actuator operable to drop a clutch pressure in said transmission to selectively disengage said at least two gears;
each of said motor actuator, said pump actuator and said at least two clutch actuators being operably coupled with said electronic control module;
said means for slowing including means for initiating dropping said clutch pressure only if a displacement of said motor is at a maximum displacement and a displacement of said pump is at a zero displacement.

* * * * *